Figure 1:
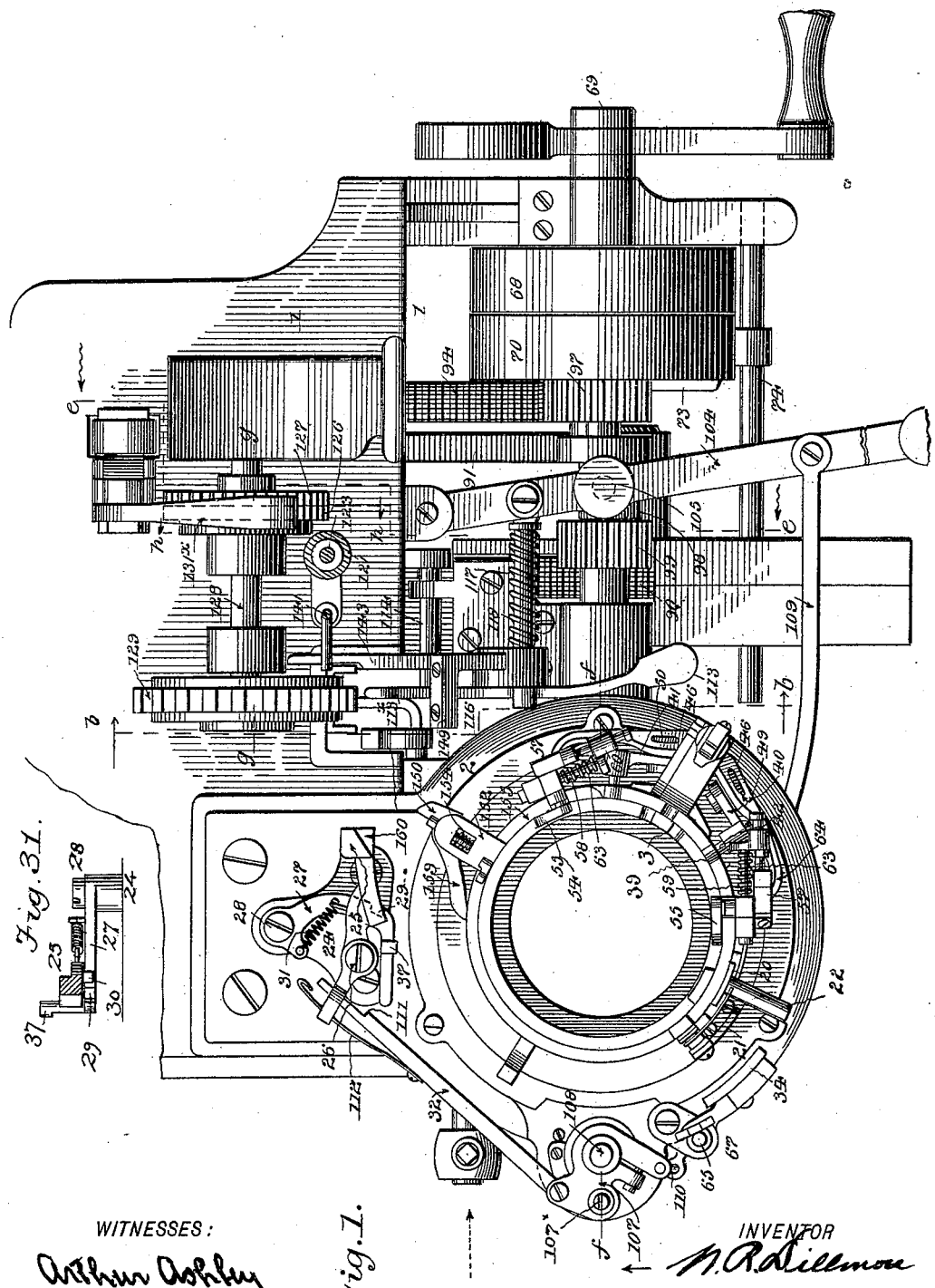

No. 649,162. Patented May 8, 1900.
W. R. DILLMORE.
KNITTING MACHINE.
(Application filed Sept. 17, 1898.)
(No Model.) 13 Sheets—Sheet 1.

WITNESSES: INVENTOR
Arthur Ashley W. R. Dillmore
G. S. Elmore BY
Phil T. Dodge
ATTORNEY.

No. 649,162.

W. R. DILLMORE.
KNITTING MACHINE.
(Application filed Sept. 17, 1898.)

Patented May 8, 1900.

(No Model.)

13 Sheets—Sheet 2.

WITNESSES:
Arthur Ashley
F. A. Elmore

INVENTOR
W. R. Dillmore
BY
Phil. T. Dodge
ATTORNEY

No. 649,162. Patented May 8, 1900.
W. R. DILLMORE.
KNITTING MACHINE.
(Application filed Sept. 17, 1898.)
(No Model.) 13 Sheets—Sheet 3.

WITNESSES:
INVENTOR
BY
ATTORNEY.

No. 649,162. Patented May 8, 1900.
W. R. DILLMORE.
KNITTING MACHINE.
(Application filed Sept. 17, 1898.)
(No Model.) 13 Sheets—Sheet 4.
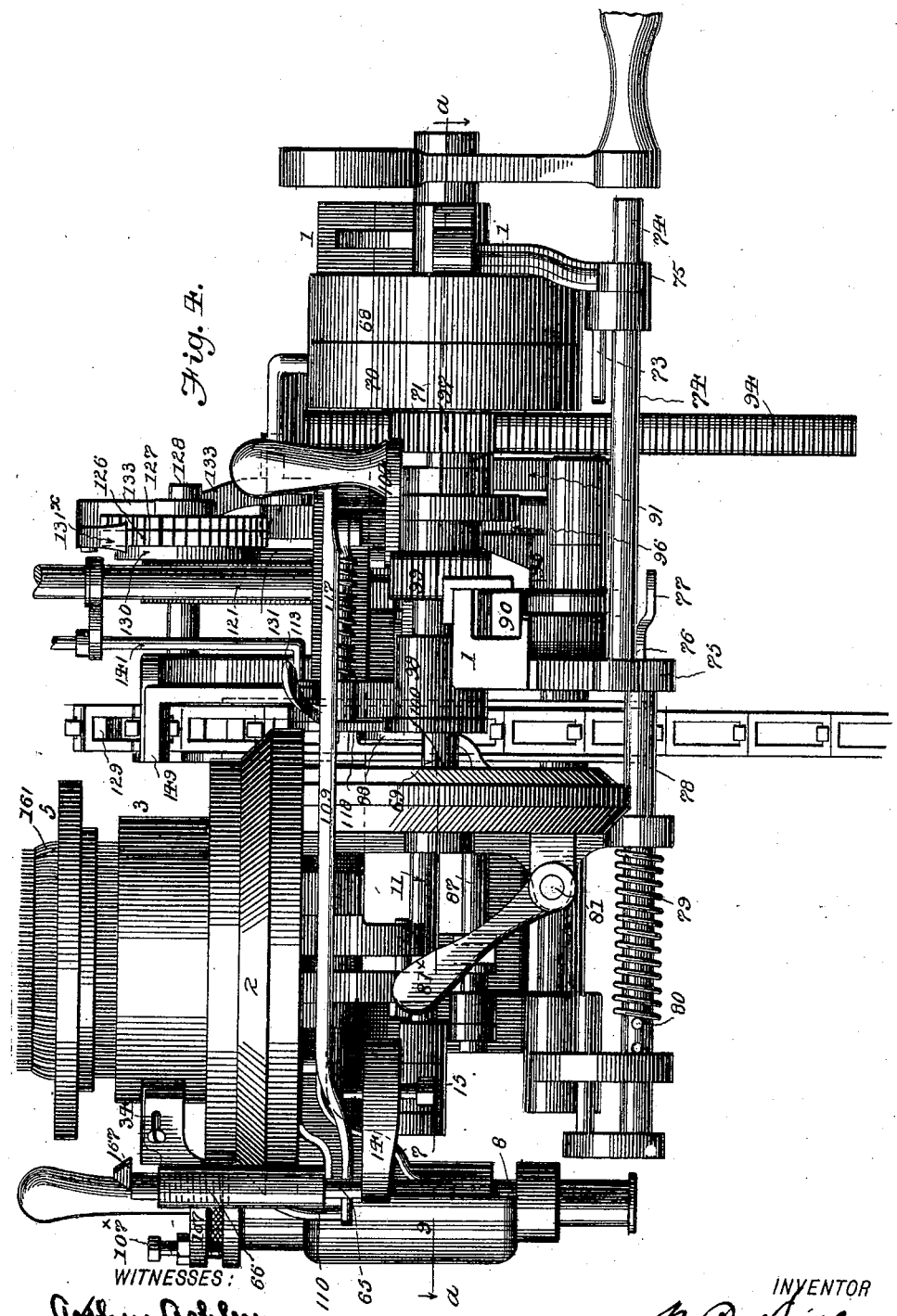

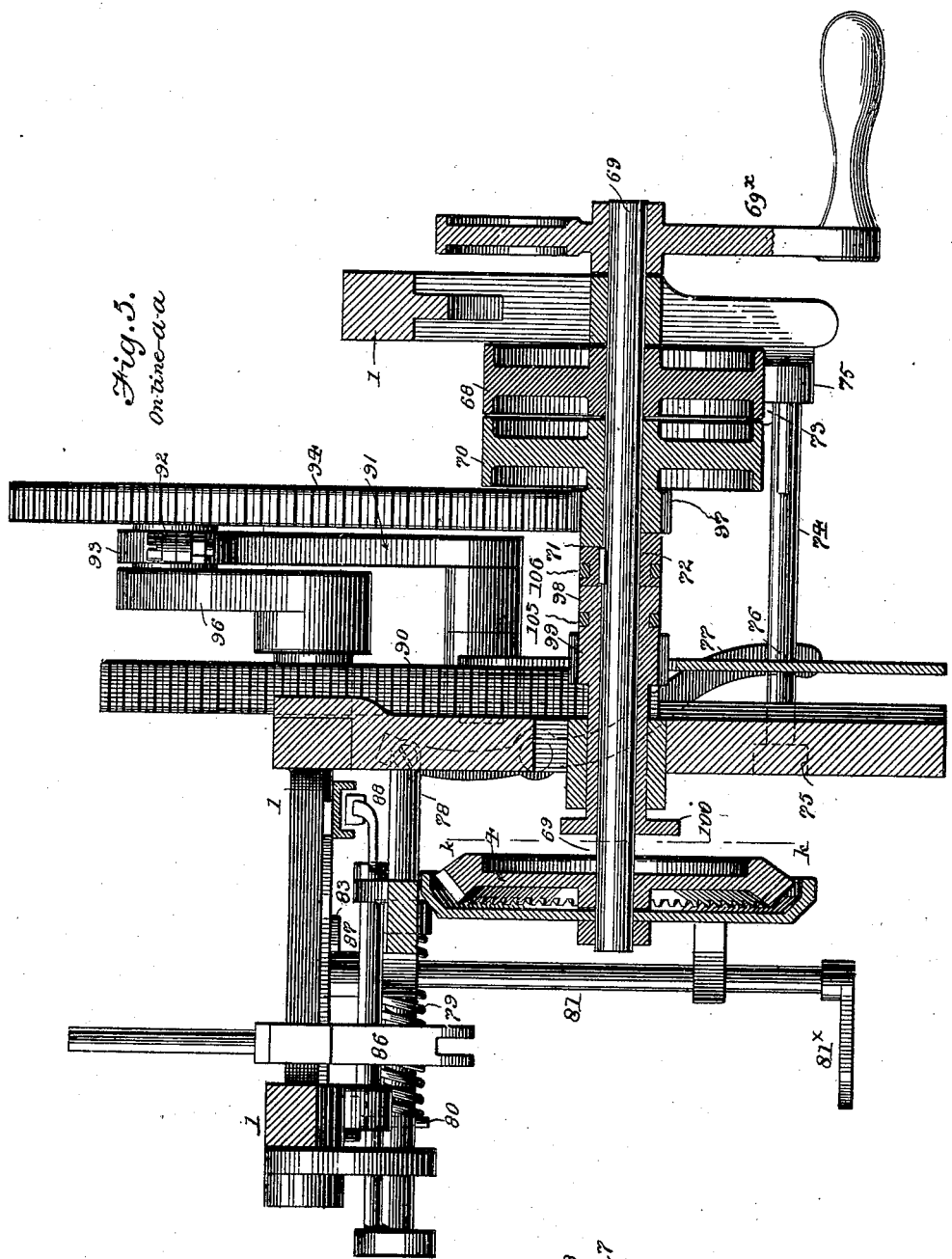

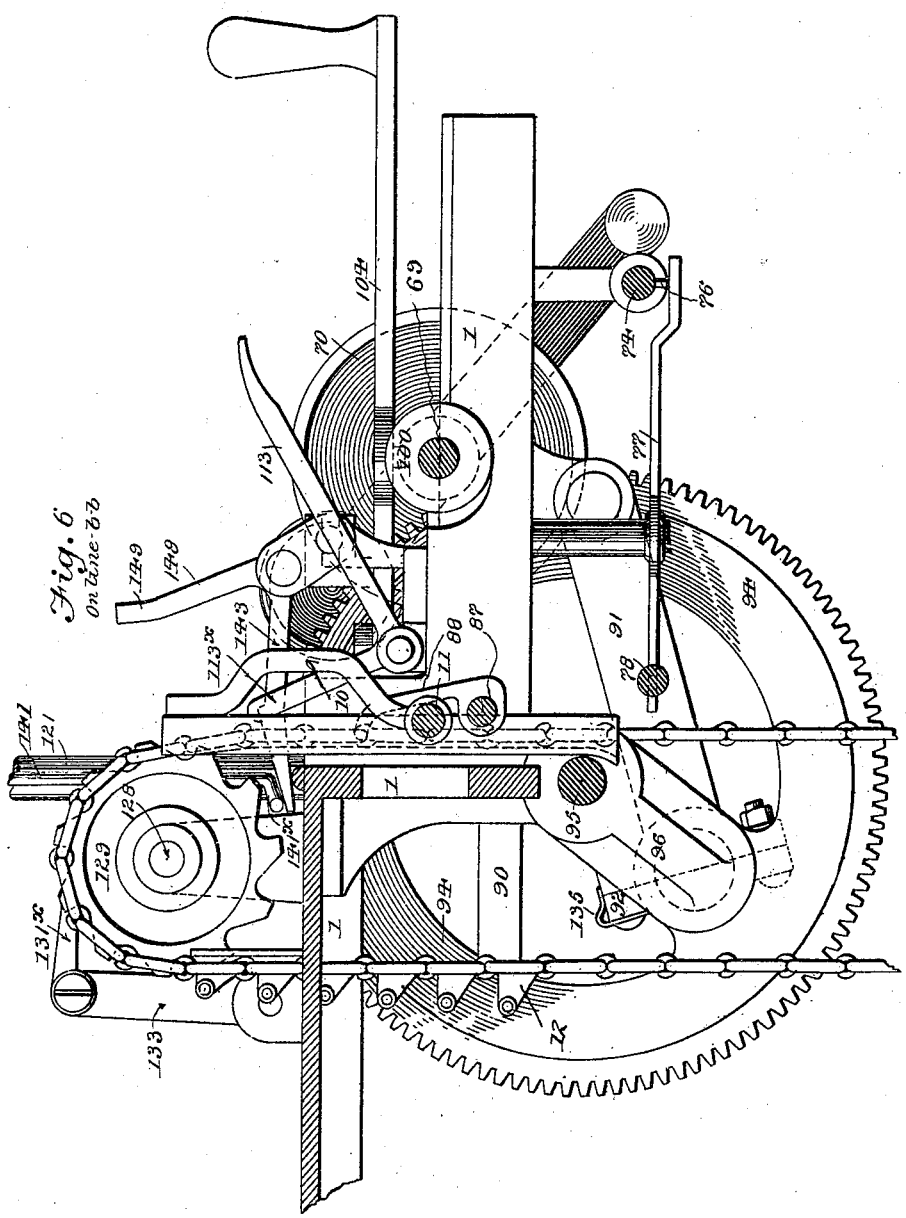

No. 649,162. Patented May 8, 1900.
W. R. DILLMORE.
KNITTING MACHINE.
(Application filed Sept. 17, 1898.)
(No Model.) 13 Sheets—Sheet 7.
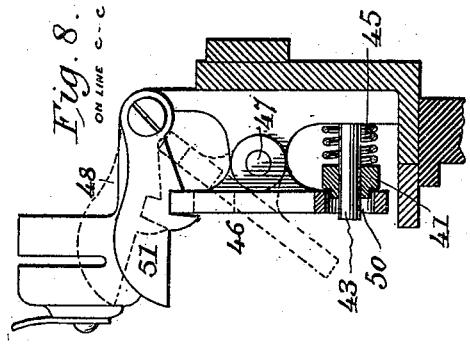
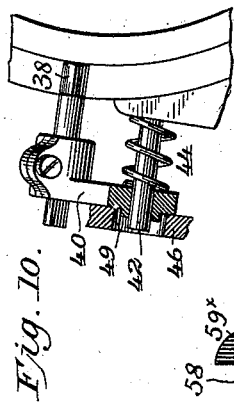
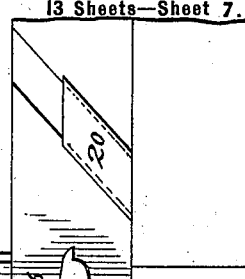
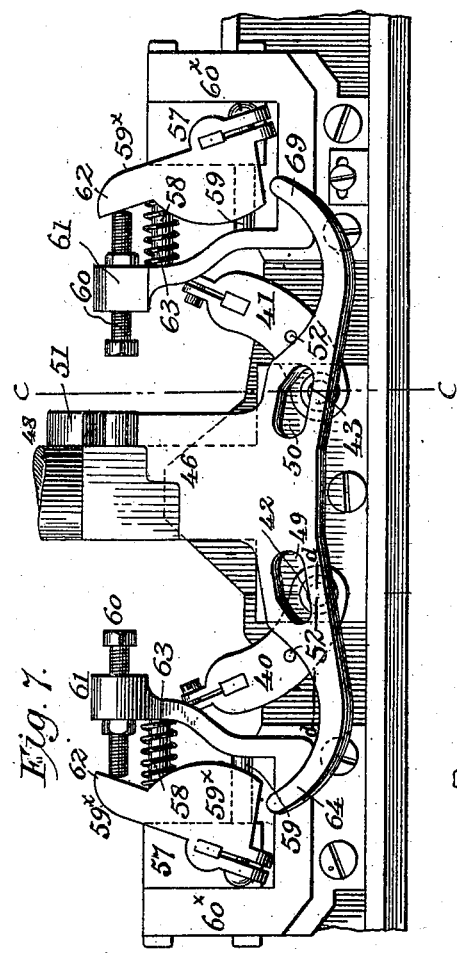
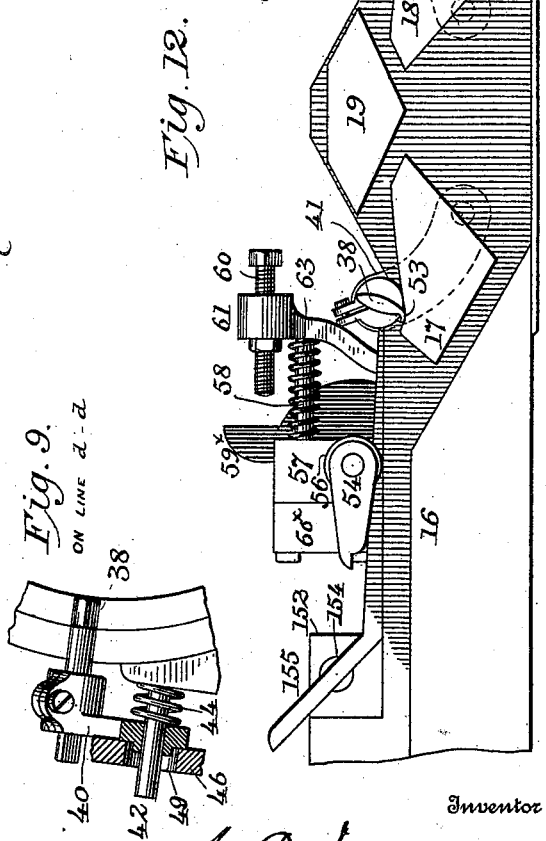

No. 649,162. Patented May 8, 1900.
W. R. DILLMORE.
KNITTING MACHINE.
(Application filed Sept. 17, 1898.)
(No Model.) 13 Sheets—Sheet 8.
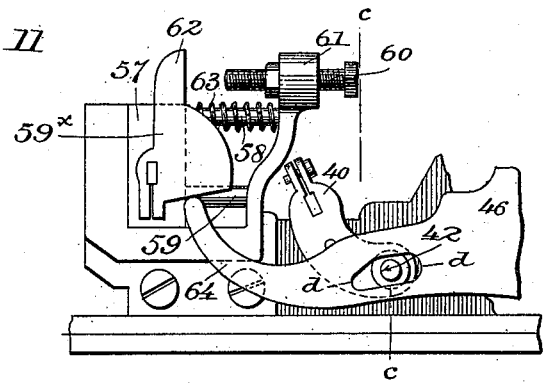
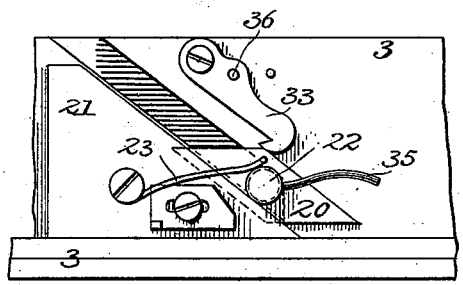
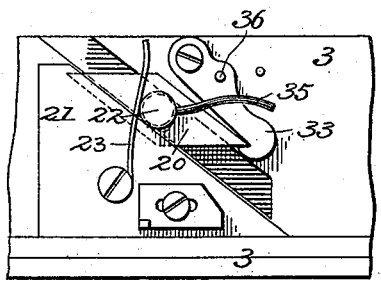
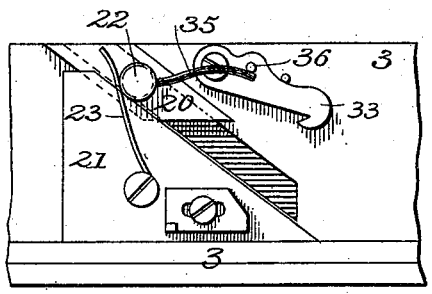
Witnesses Inventor
THE NORRIS PETERS CO., PHOTO-LITHO., WASHINGTON, D. C.

No. 649,162. Patented May 8, 1900.
W. R. DILLMORE.
KNITTING MACHINE.
(Application filed Sept. 17, 1898.)
(No Model.) 13 Sheets—Sheet 9.

On-line-e-e

WITNESSES:

INVENTOR
BY
ATTORNEY.

No. 649,162. Patented May. 8, 1900.
W. R. DILLMORE.
KNITTING MACHINE.
(Application filed Sept. 17, 1898.)
(No Model.) 13 Sheets—Sheet 10.
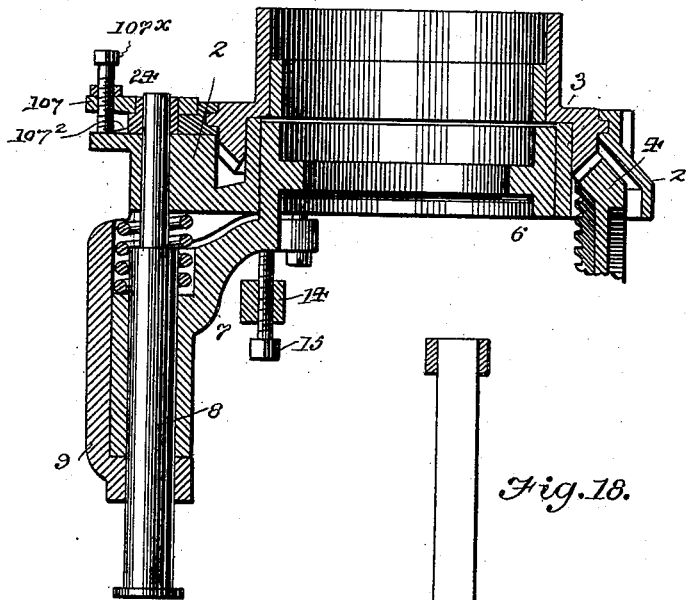
Fig. 17.
On line f-f.
Fig. 18.
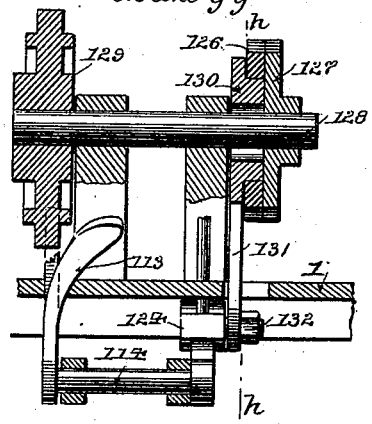
Fig. 19.
On line g-g.
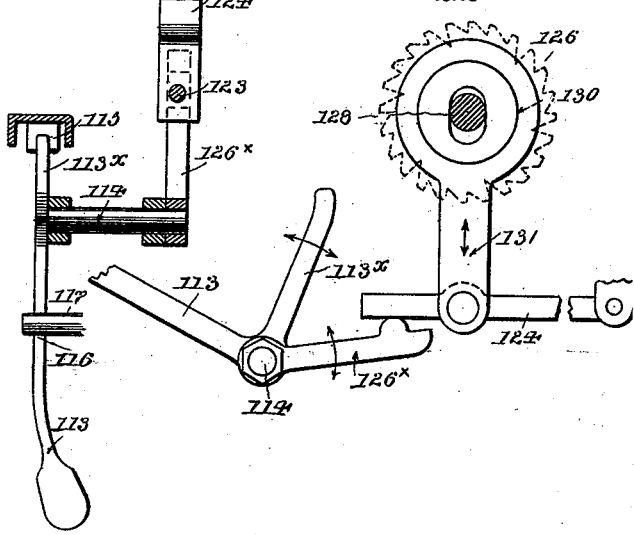
Fig. 20.
On line h-h.
WITNESSES:
INVENTOR
BY
ATTORNEY.

No. 649,162. Patented May 8, 1900.
W. R. DILLMORE.
KNITTING MACHINE.
(Application filed Sept. 17, 1898.)
(No Model.) 13 Sheets—Sheet 11.
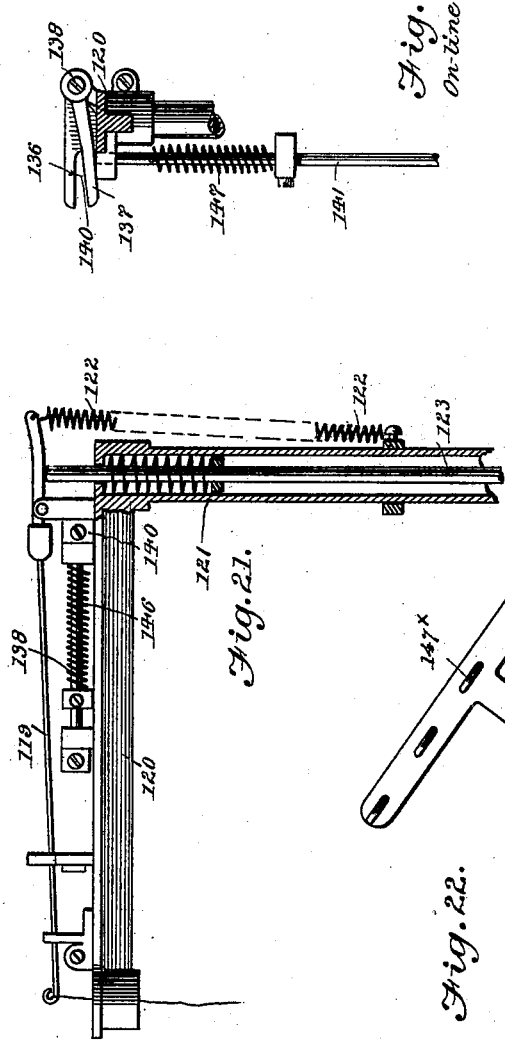
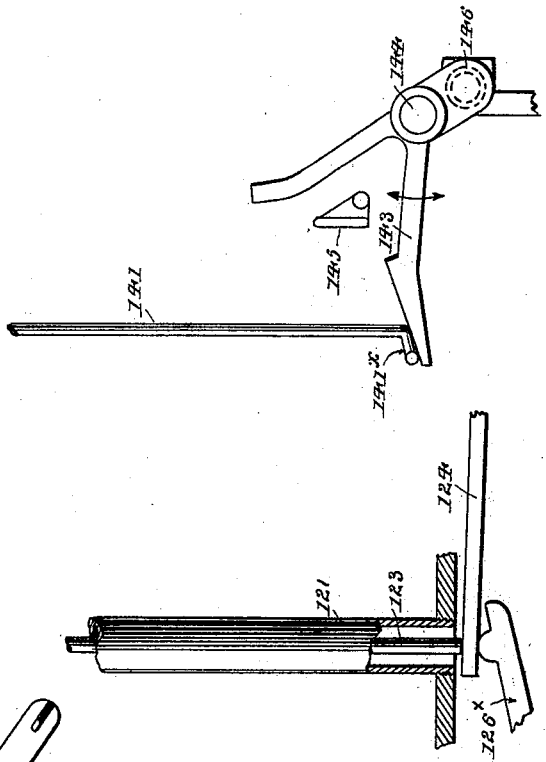
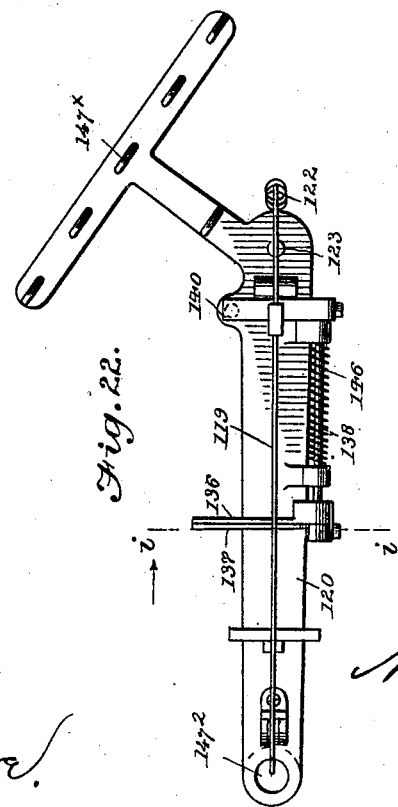
WITNESSES: INVENTOR
BY
ATTORNEY No. 649,162.  
W. R. DILLMORE.  
KNITTING MACHINE.  
(Application filed Sept. 17, 1898.)
Patented May 8, 1900.
(No Model.)
13 Sheets—Sheet 12.
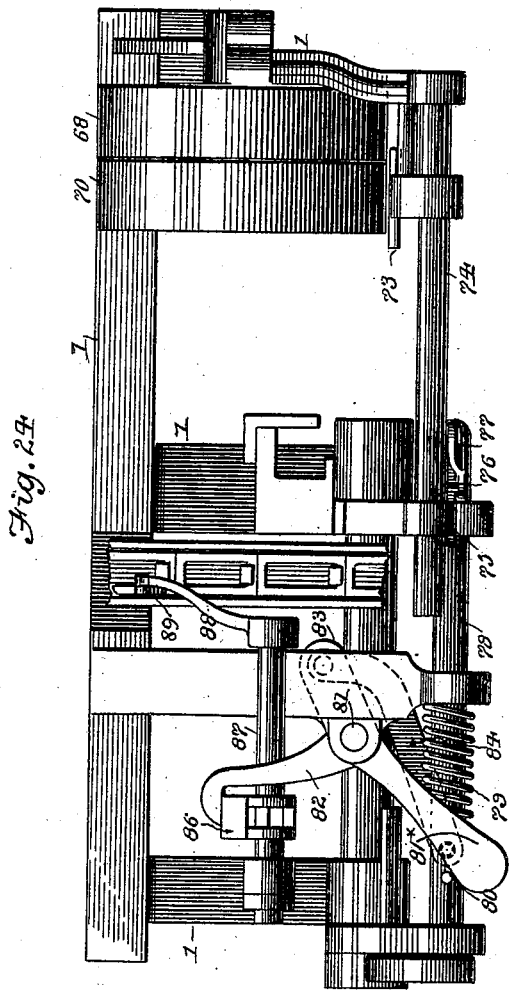
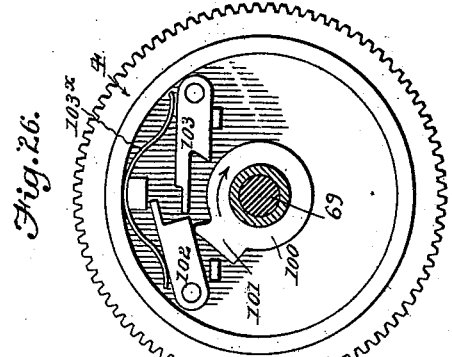
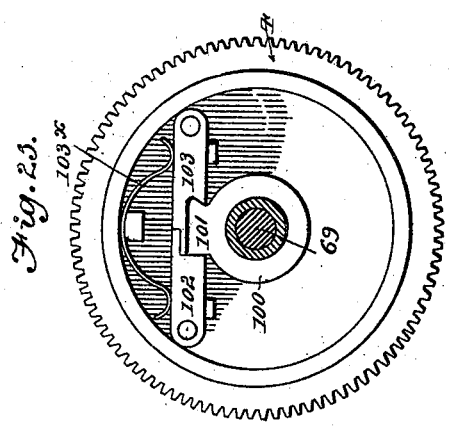
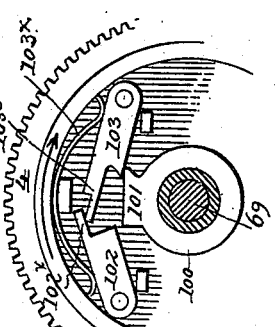
WITNESSES:  
Arthur Ashley  
G. S. Elmore
INVENTOR  
W. R. Dillmore  
BY  
Phil T. Dodge  
ATTORNEY
THE NORRIS PETERS CO., PHOTO-LITHO., WASHINGTON, D. C.

No. 649,162. Patented May 8, 1900.
W. R. DILLMORE.
KNITTING MACHINE.
(Application filed Sept. 17, 1898.)
(No Model.) 13 Sheets—Sheet 13.

On line j-j

WITNESSES:
Arthur Ashley
F. J. Elmore.

INVENTOR
W. R. Dillmore
BY
Phil. T. Dodge
ATTORNEY.

UNITED STATES PATENT OFFICE.

WILLIAM R. DILLMORE, OF PHILADELPHIA, PENNSYLVANIA, ASSIGNOR TO THE KEYSTONE KNITTING MACHINE MANUFACTURING COMPANY, OF PENNSYLVANIA.

KNITTING-MACHINE.

SPECIFICATION forming part of Letters Patent No. 649,162, dated May 8, 1900.

Application filed September 17, 1898. Serial No. 691,203. (No model.)

*To all whom it may concern:*

Be it known that I, WILLIAM R. DILLMORE, of Philadelphia, county of Philadelphia, and State of Pennsylvania, have invented a new and useful Improvement in Knitting-Machines, of which the following is a specification.

This invention relates to knitting-machines, and has reference more particularly to circular machines employing a single set of needles to produce a tubular seamless web. In knitting stockings on a machine of this character it is the practice in the "heeling" and "toeing" operations to first raise out of action a portion of the needles, usually one-half, with their stitches retained and effect the narrowing of the fabric by raising out of action, one at a time, at the end of each course, by a rotary reciprocating motion of the cam-cylinder, a portion of the needles left in action. This is continued until the requisite number of needles have been elevated, when they are again lowered into action, one at a time, to effect the widening of the fabric, after which the cylinder is given a rotary motion with all the needles in action to again produce plain tubular work.

The present invention consists in various improvements in the mechanism for effecting these operations, directed more particularly to the construction and operation of the various cams, to the form and construction of the driving-gear to render the various operations and changes in action automatic, and to various other details of construction having in view effectiveness and certainty of operation and compactness in form.

Figure 2:
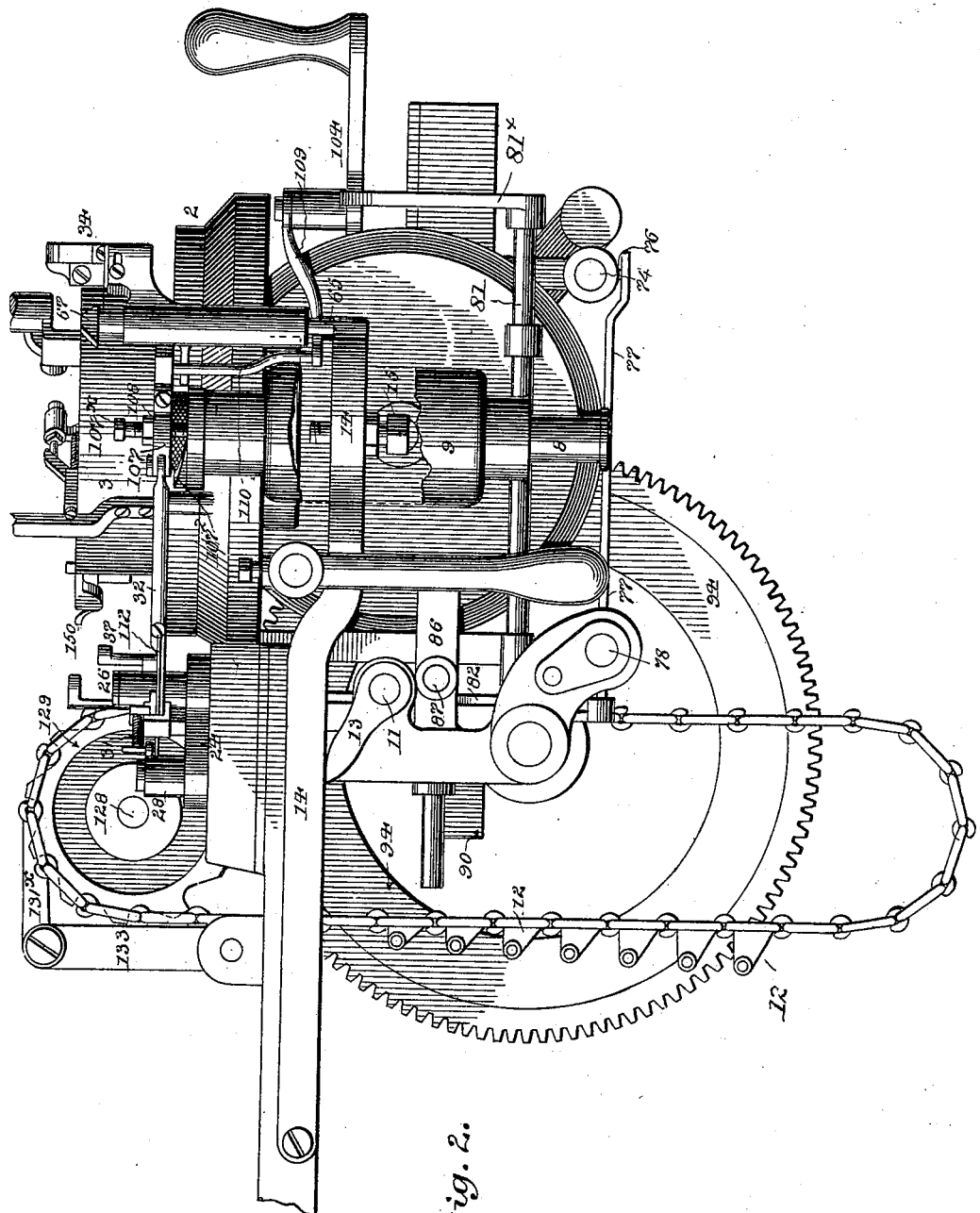
Figure 3:
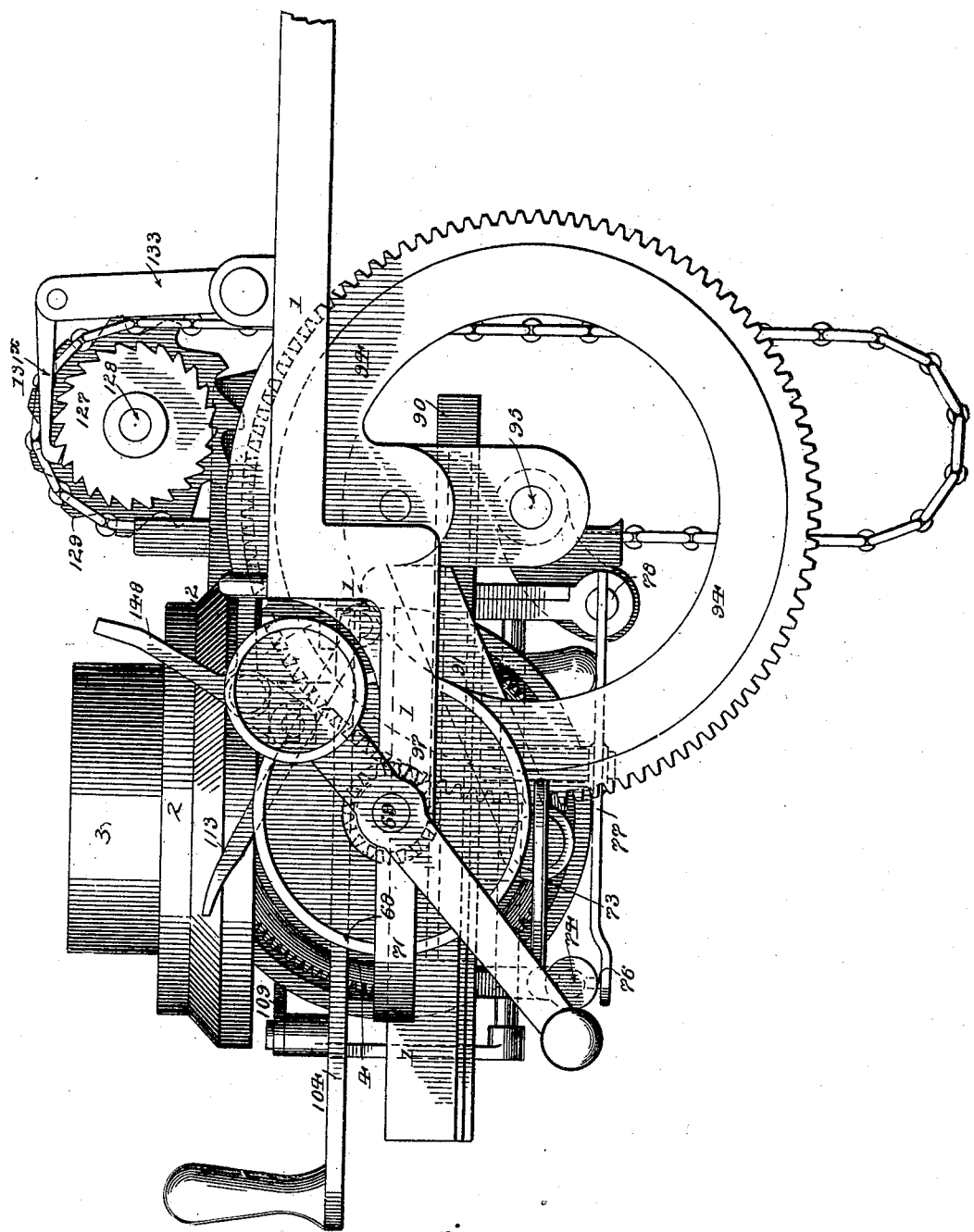
Figure 16:
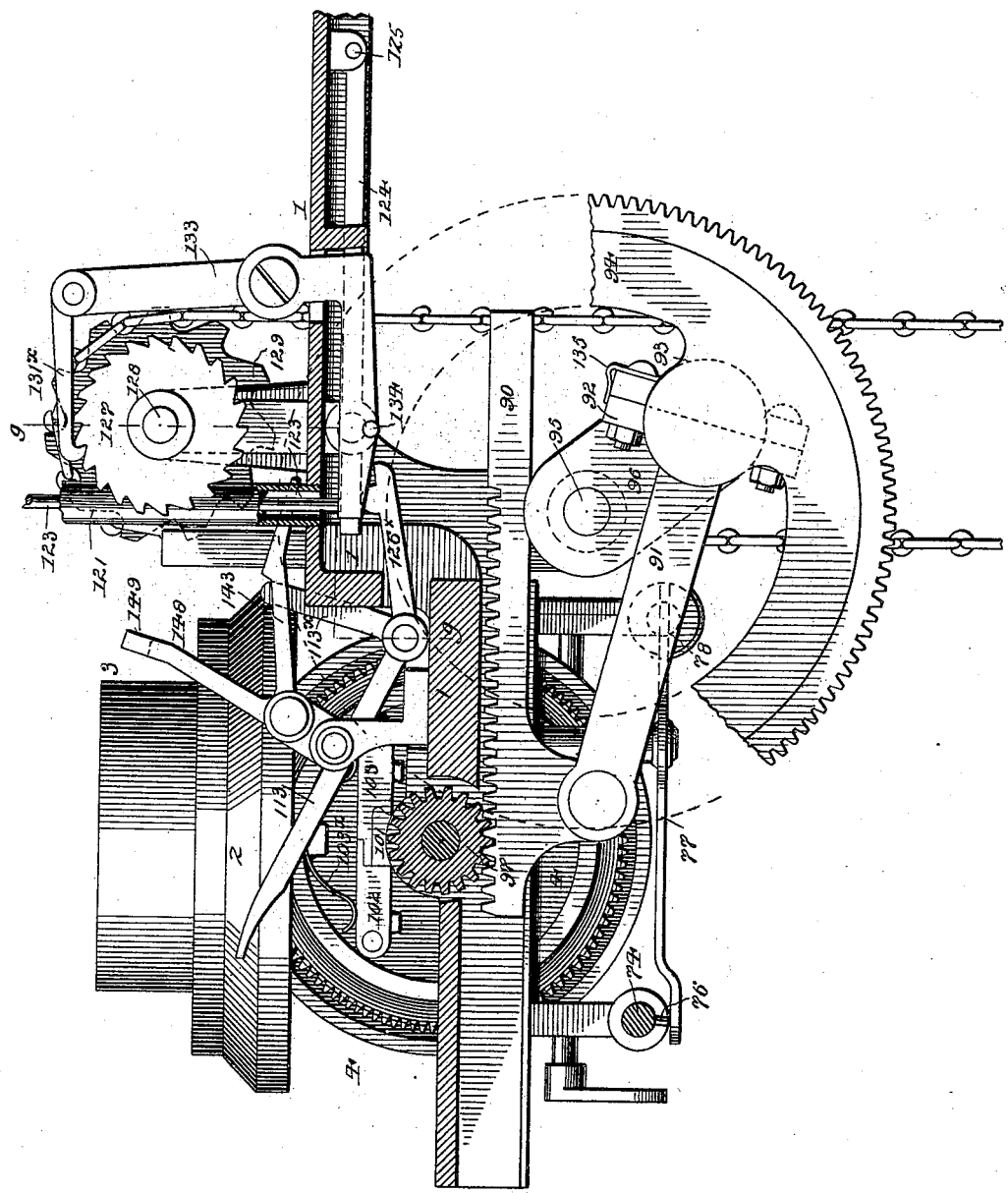
Figure 27:
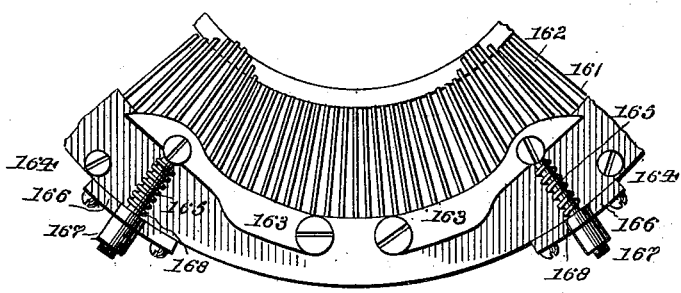
Figure 28:
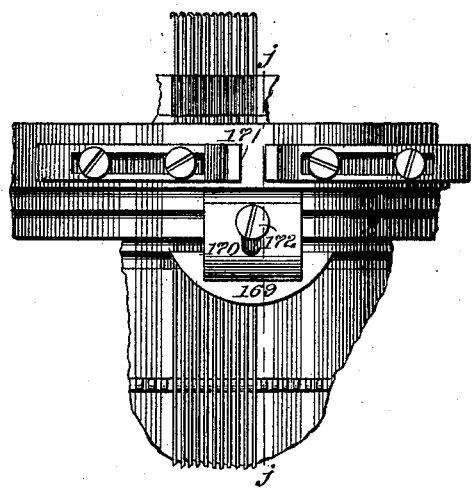
Figure 29:
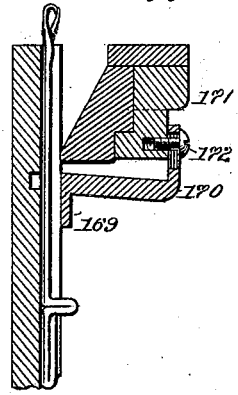
Figure 30:
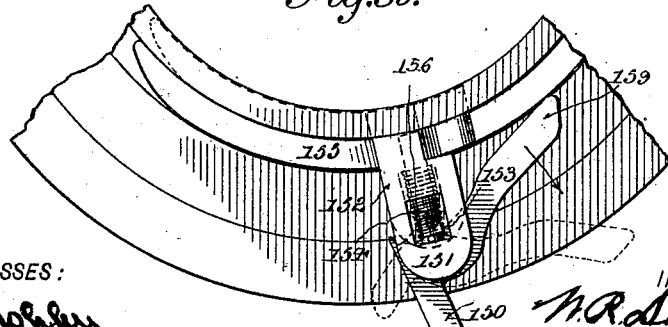

In the accompanying drawings, Figure 1 is a top plan view of my improved machine, the needle-cylinder and take-up device being removed to expose other parts to view. Fig. 2 is a side elevation of the same as viewed in the direction of the dotted arrow in Fig. 1. Fig. 3 is an elevation of the machine as viewed from the opposite side. Fig. 4 is a front elevation of the machine with the needle-cylinder and needles in place and the take-up device omitted. Fig. 5 is a horizontal section through the machine at the driving-shaft.
Fig. 6 is a vertical sectional elevation through the driving-shaft on the line $b\ b$ of Fig. 1, as viewed in the direction of the arrows in full lines. Fig. 7 is an elevation, on an enlarged scale, of a part of the cam-cylinder as viewed from the outside, showing how the picking-cams for raising and lowering the needles, one at a time, are located and operated. Fig. 8 is a vertical sectional elevation on the line $c\ c$ of Fig. 11. Fig. 9 is a similar view on the line $d\ d$ of Fig. 7, showing the elevating picking-cam in an operative position. Fig. 10 is a similar view with the cams in an inoperative position. Fig. 11 is an elevation of one of the depressing picking-cams in an operative position as viewed from the outside. Fig. 12 is a view in the nature of a development of the inner face of the cam-cylinder, showing the form and arrangement of the elevating and depressing picking-cams, the inclined cam for raising one-half the needles out of action, and the cam for returning these needles into action. Fig. 13 is an elevation of the outside of the cam-cylinder, showing the cam for raising one-half the needles out of action, the same being in its lower inoperative position. Fig. 14 is a similar view with the cam locked in action. Fig. 15 is a similar view showing the cam in its higher position, showing how it is unlocked. Fig. 16 is a sectional elevation through the machine on the line $e\ e$ of Fig. 1 as viewed in the direction of the wavy arrows. Fig. 17 is a vertical sectional elevation on the line $ff$ of Fig. 1, with the needle-cylinder omitted and showing how it is supported and operated. Fig. 18 is a plan view of the mechanism operated by the pattern-chain for controlling the action of the take-up device and driving mechanism for the pattern-chain. Fig. 19 is a vertical sectional elevation on the line $g\ g$ of Fig. 16. Fig. 20 is a vertical sectional elevation on the line $h\ h$ of Fig. 19. Fig. 21 is a vertical sectional elevation of the take-up mechanism and thread-severing mechanism. Fig. 22 is a top plan view of the same. Fig. 23 is a sectional elevation of the same on the line $i\ i$ of Fig. 22, showing the thread-severing mechanism and its operating devices. Fig. 24 is a front elevation of the belt-shifting mechanism. Fig. 25 is a sectional elevation on the line $k\ k$ of Fig. 5, showing the 1co clutch. Fig. 26 is a similar view of the clutch in the act of locking. Fig. 26ᵃ is an elevation of the clutch in another position. Fig. 27 is a top plan view of a portion of the needle-cylinder, showing the sinker-cam. Fig. 28 is a side elevation of a portion of the needle-cylinder, showing the guard-cam for acting on the elevated needles to bring them into position to be engaged by the depressing-cams. Fig. 29 is a vertical section of the same on the line $jj$ of Fig. 28. Fig. 30 is a top plan view of a portion of the cam-cylinder, showing the cam for returning the needle first elevated into action and how it is mounted and operated. Fig. 31 is a sectional elevation of the gate and its locking-latch.

Referring to the drawings, 1 represents a frame, in the form of a flat bed-plate, provided at its rear with a projecting portion adapted to be fastened securely to a suitable support. At its front, to the left in Fig. 1, it has attached to it a cylindrical shell 2, in which is mounted a rotary cam-cylinder 3, having beveled teeth on its lower edge engaged by a vertical beveled gear 4, adapted to be driven by the mechanism hereinafter described.

5 represents a needle-cylinder seated within the cam-cylinder in a clamping-ring 6, Fig. 17, connected to an arm 7, projecting from a vertical post 8, movable to a limited extent vertically in a tubular depending casting 9, formed on the shell. This construction permits the needle-cylinder to be raised slightly to lengthen the stitches to produce slack work for the leg of the stocking, which is effected by means of an arm 10, Fig. 6, fixed to a horizontal rock-shaft 11, in position to be engaged by a high link 12 on the pattern-chain. The rock-shaft is mounted in bearings on the under side of the bed-plate and has fixed to its outer end a finger 13, Fig. 2, engaging beneath a lever 14, pivoted at its rear end to the side of the bed-plate. The lever extends forward and curves inward beneath the clamping-ring, where it is provided with a vertical adjustable screw 15, adapted to engage the under side of the arm 7. By the passage of the high link on the pattern-chain beneath the arm 9 the clamping-ring will be raised, thereby elevating the cylinder and lengthening the stitches to produce loose work.

As shown in Fig. 12, the cam-cylinder is formed on its inner side with a ledge 16, on which the heels of the needles are sustained when not reciprocated to form the stitches, and at one point this ledge is interrupted, where are located two stitching-cams, comprising two side cams 17 and 18 and a central cam 19. The two side cams are of such form that when the cam-cylinder is moved in either direction one of the cams will engage the heels of the needles, elevate them slightly to a point where the central cam will engage and lower them in the path of the other side cam, which latter will depress the needles, which latter will be finally elevated to the normal position by a downward continuation of the ledge. The reciprocating movement of the needles effected in this manner form the stitches, and the continued rotation of the cam-cylinder will act to produce a tubular seamless fabric of the usual and well-known form.

In proceeding to form a heel or toe it is necessary to elevate half the needles, so that they will not be operated by the stitching-cams, but will retain their stitches. This is accomplished, as shown in Figs. 13, 14, and 15, by means of an inclined cam 20, mounted to slide vertically in an inclined slot or recess in the cam-cylinder. The recess extends below the ledge 16, and when out of action the cam rests in the bottom of the recess below the ledge, so as not to engage the needles. When raised to the position shown in Fig. 14, the inclined face of the cam will engage the needles and raise them above the stitching-cams and out of action. The cam is raised to an operative position by means of an inclined track 21, fixed to the outer side of the cam-cylinder adjacent to the cam, and the track is adapted to ride beneath an arm 22, projecting laterally from the cam, and elevate the same against the pressure of a spring 23 when the arm encounters a gate 24, Fig. 1, adapted to be adjusted temporarily in the path of the arm. This gate comprises a horizontal lever 25, pivoted, as at 26, on a vertical axis rising from the bed-plate, and adjacent to the lever is pivoted a locking-latch 27, mounted on an axis 28. The latch is of angular form and extends beneath the lever, being provided with a notch 29, adapted to receive a shoulder 30, Fig. 31, on the under side of the lever when the latter is moved inward and to lock the same in position. The lever is urged outward by means of a spring 31, connected to it and the latch and tending to move the latch in the opposite direction, the result being that when the lever is thrown inward the latch will be moved automatically outward, and the shoulder entering the notch the lever will be locked. The lever is moved inward by means of an operating-rod 32, more fully described hereinafter, and when in this position the rotation of the cam-cylinder will cause the engagement of the arm 22 on the inclined cam with the gate-lever, which will momentarily arrest the advance of the cam and the track riding beneath the cam. The latter will be raised by the track to the position shown in Fig. 14, in which position it will be locked by a gravitating hook 33, pivoted to the outside of the cam-cylinder in position to engage beneath the lower edge of the cam, as shown in Fig. 14. The cam will be held in this position, elevating the needles out of action, until the cam-cylinder makes half a revolution, when the arm 22 will encounter a track 34, Figs. 2, 3, and 4, fixed to the bed-plate, by which the cam will be raised still higher to the position shown in Fig. 15 to clear the heels of the needles remaining in action. On leaving the track the lower edge of the cam will override the heels of the active needles until the end of the series is reached, when it will be returned by the spring to its normal inoperative position in the bottom of its guiding-recess. The gravitating hook is disengaged to release the cam when the latter rises to its highest position by a finger 35, fixed to the arm and adapted to engage a pin 36 on the hook, as shown in Fig. 15, and the parts are held in this position while the cam overrides the heels of the active needles. When the end of the series is reached, as described, the spring 23, acting on the arm 22, will throw the cam downwardly before the hook can move inward to engage the cam. After the cam has been raised in the first instance by the track on the contact of the arm with the gate-lever the latter is unlocked by the arm on the cam encountering a vertical lug 37 on the end of the locking-latch, which will throw the latter outward and disengage the shoulder from the notch, and the spring will pull the gate-lever outward to an inoperative position, as shown in Fig. 1. After the needles have been thus raised out of action the narrowing operation is effected by raising a portion of the remaining needles, one by one, at the end of each course to an inoperative position with the needles first raised. This is effected by a reciprocating movement of the cam-cylinder to bring into action alternately two elevating picking-cams 38 and 39, Figs. 7 to 12, by which the needles on the ends of the series in action are raised alternately out of action. These cams are fixed on the upper ends of arms 40 and 41, extending at the outside of the cam-cylinder and mounted loosely at their lower ends on fixed studs 42 and 43, projecting outward from the cam-cylinder, the construction permitting both a pivotal movement of the cams and a movement transversely of the cam-cylinder from an inoperative position, as shown in Fig. 10, to an operative position, as shown in Fig. 9. The lower ends of the arms are acted on by spiral springs 44 and 45, encircling the studs between the arms and the cylinder, which tend to hold the arms outward, with the cams in an inoperative position. The cams are thrown into action by means of a vertical yoke-plate 46, pivoted above the cams, as at 47, on a bracket 48, rising from the cam-cylinder at its outer side. Near its lower edge the yoke is provided with inclined slots 49 and 50, through which the ends of the studs extend when the yoke-plate is moved inward, as shown in Fig. 8. When the cams are out of action, this yoke is held outward by the spiral springs acting against the arms, and an inward movement of the yoke will force the arms along the studs and move the cams inward to an operative position, as shown in Fig. 9. The yoke is moved inward automatically by engaging the gate-lever 25 and is locked inward to hold the cams in action by a gravitating dog 51, pivoted to the side of the bracket 48 and formed in its under edge with a notch in position to receive the upper extended edge of the yoke when the latter is moved inward at its lower end. In moving from an inoperative position inward to an operative position, it is desirable that the picking-cam 38 be moved upward to avoid contact with the heels of the needles occupying the level of the ledge. This is effected by a pin 52 on the arm 41 encountering the gate-lever. The arrangement is such that the pin will engage the lever previous to the engagement of the yoke, so that the arm will be moved on its axis, carrying the cam upward, which action will be followed by the inward movement of the cam to its operative position. After the disengagement of the pin with the lever, the picking-cam, under the influence of the torsional action of its spring, which has one end connected to the arm and its other end connected to the cylinder, will drop back and ride on the heels of the needles until the end of the series in action is reached, when it will fall to its operative position on the upper edge of the side stitching-cam, as shown in Fig. 12. This picking-cam, when riding upon the heels of the needles in action, as described, is followed by the inclined elevating-cam 20 before alluded to, which latter acts to raise one-half the needles out of action, so that the cam rides upon the heels of these needles before they are elevated, and the cam-cylinder in continuing to revolve carries the picking-cam around until the inactive needles are reached, when it falls, ready to engage the end needle of the series left in action. The heel of this end needle enters a notch 53 in the edge of the picking-cam, and the latter will be moved upward, carrying the needle with it to an inoperative position with the others raised by the inclined cam 20. The picking-cam disengages the needles thus raised and falls back on the heels of the other needles until the end of the series is reached, when it falls back to its former operative position on the stitching-cam, ready to repeat the operation. The other picking-cam acts in the same manner when the cam-cylinder moves in the opposite direction to raise the needle on the opposite end of the series of active needles to an inoperative position. It is seen, therefore, that by the reciprocating movements of the cam-cylinder and the combined actions of the two elevating picking-cams one needle at a time is raised out of action alternately from the ends of the series of needles in action, and by these means the narrowing of the fabric at the heel and toe is effected. These operations continue until the required number of needles have been raised to produce the proper narrowness of the fabric, when it is necessary to again lower the needles one at a time until all those raised by the two picking-cams are again in action. This is accomplished by two depressing picking-cams 54 and 55, sustained adjacent to the two picking-cams just described and each mounted on the inner end of a pivot-pin 56, mounted to turn loosely in a cam carrier or block 57, sliding on two horizontal guide-rods 58 and 59, sustained between vertical standards 60× and 61, fixed to the cam-cylinder. The outer end of the pivot-pin 56 has fixed to it a weighted plate 59×, extending in a direction opposite the cam, which plate tends to hold the cam by gravity with its end inclined upward in position to engage the heels of the elevated needles. The movement of this plate is limited by a horizontal adjustable stop 60, extending through the standard 61, with its end in position to be encountered by an upwardly-projecting finger 62 on the weighted plate. By the adjustment of this stop the active position of the end of the cam may be changed to meet the varying conditions encountered in practice. The sliding block 57 is acted on by a spring 63, encircling the guide-rod 58, which spring tends to hold the block outward in the position shown in Fig. 12, but permits it to move inward, carrying the cam along bodily, so that when the notched end of the cam engages the heel of an elevated needle it will hold it positively and with certainty as the cam turns downward on its pivot-pin and the needle will be lowered, the bodily movement of the cam counteracting the effect of the movement of the cam-cylinder, so there is no relative movement of the needle and cam.

In order that when the elevating picking-cams are thrown into action the depressing picking-cams may be rendered inoperative and in order that the latter may be rendered operative when the elevating-cams are moved out of action, the yoke-plate 46 is formed with upwardly-extending curved arms 64, terminating adjacent to the weighted plates on the depressing-cams in position to engage the lower edges of the plates and push them upward, as shown in Fig. 11, with the depressing-cams inactive when the yoke is moved inward by the gate, as shown in Figs. 8 and 11, the movement of the plate around its axis 47 to the vertical position in Fig. 8 causing the arms 64 and 69 to rise slightly. When the yoke is moved outward by the release of the locking-dog 51 described, the ends of the upwardly-curved arms will disengage the weighted plates and the latter will fall by gravity, thereby elevating the ends of the cams to an operative position.

The release of the yoke to render the elevating picking-cams active and permit the depressing picking-cams to operate is accomplished automatically by the pattern-chain through the medium of the same mechanism by which the cylinder was raised to lengthen the stitches. As shown in Fig. 4, the end of the lever 14 bears against the lower end of a vertical sliding rod 65, mounted in a tubular guide on the side of the frame-shell, which rod is encircled by a spiral spring 66, acting thereon to hold it downward, but permitting it to yield vertically. On the upper end of the rod a beveled head 67 is fixed, which when the rod is in its depressed normal position will just be cleared by the projecting end of the locking-dog 51, but which when the rod is elevated will project in the path of the dog, and the latter, engaging it, will be raised, and the yoke will be thrown outward at its lower end by the springs 44 and 45, before described. This mechanism does not interfere with the action of raising the needle-cylinder, the parts being so formed that the pivoted arm will engage and raise the head 67 before the screw 15 for raising the cylinder engages the clamping-ring, so that, while a link of one height will operate to raise the cylinder, a lower link through the same mechanism will operate the head 67 without raising the cylinder.

Before beginning the narrowing and widening operations for the heel and toe by the actions of the various cams and mechanisms described I propose to provide for the incorporation in the fabric of an extra thread or threads to reinforce the fabric at the heel or toe, and to permit this the motion of the machine is stopped automatically by the operation of a belt-shifting mechanism by the pattern-chain, which mechanism operates to shift the driving-belt to a loose idler-pulley 68, mounted loosely on the end of a driving-shaft 69, mounted in bearings on the under side of the bed-plate and connected to the beveled gear 4, as shown more particularly in Figs. 1, 4, 5, and 6. The rotation of the cam-cylinder to produce plain tubular work is effected by a driving-pulley 70, mounted loosely on the shaft, with its hub toothed, as at 71, to engage interlocking teeth on the end of a sleeve 72, splined to the driving-shaft, but movable longitudinally thereof. The driving-belt is adapted to pass through a belt-loop 73, fixed to a horizontal rod 74, mounted to slide endwise in guides 75 on the under side of the bed-plate. The end of this rod is provided with a pin 76, engaging in a slot in the forward end of a horizontal lever 77, pivoted about midway of its length to the bed-plate. The rear end of the lever is pivoted to one end of a sliding rod 78, mounted in guides on the bed-plate, and the rod is acted on by a spiral spring 79, encircling the same between the pin 80 and the guide. The spring tends to urge the rod to the left, Fig. 24, in which position the belt-loop will hold the belt on the loose pulley 68. The rod is moved in the opposite direction to shift the belt to the driving-pulley by a horizontal operating-bar 81, extending in a fore-and-aft direction above the rod 78 and having a handle 81× fixed to its forward end. It has fixed to its rear end an elbow-lever 82, one arm 83 of which is connected to the sliding rod by a link 84, curved upward where it joins the arm 83, so as to pass the center of the axis of the elbow-lever. In this position of the parts the spring is compressed and in tending to expand throws the elbow-lever to the left, and by reason of the curved end of the link being connected with the arm of the elbow-lever when the parts are in this position above the axis of the lever the parts are held in this position. The other arm 82 of the elbow-lever is notched to receive the edge of a horizontal pivoted lever 86, mounted on a rock-shaft 87, extending longitudinally of the machine in front of the pattern-chain, at which point it is provided with a finger 88, extending opposite the chain adjacent to the same. When the belt is to be shifted, a high link 89 on the chain engages the finger, rocks the shaft 87, lifts the end of the arm 82 of the elbow-lever, thereby moving the other arm downward past the center of its axis, when the spring on the sliding rod will throw the latter to the left and through the connecting-levers will throw the belt to the right on the idler-pulley and stop the machine.

The reciprocating motion of the cam-cylinder is imparted to the same by a horizontal rack-bar 90, Figs. 1, 3, 4, 5, and 16, mounted to reciprocate in a fore-and-aft direction on the under side of the bed-plate. It has jointed to it the forward end of a link 91, the rear end of which is provided with a cross-head 92, mounted loosely on a stud 93, projecting inward from the side of a vertical circular rotating rack 94. This rack is sustained in a vertical position and guided in its rotation by a horizontal shaft 95, mounted in bearings on the under side of the bed-plate and connected to the rack by a crank-arm 96, fixed to the end of the shaft and connected to the stud 93 inward to the cross-head. The rotary rack is driven by a pinion 97, connected to the hub of the drive-pulley 70, which pinion also gives motion to the drive-shaft through the sleeve 72, as before described. Adjacent to the sleeve 72 a collar 98 loosely encircles the drive-shaft and has fixed to it a pinion 99, engaging the rack-bar 90. This pinion has its hub extended beyond the rack-bar, where it is provided with a clutch-head 100, Fig. 26, having a peripheral projection 101 undercut at one side. This clutch-head is locked to the bevel-gear 4 by means of two dogs 102 and 103, pivoted to the face of the wheel at their outer ends, acted on by springs 103× and formed at their inner ends to interlock. The dog 103 is undercut to receive the undercut portion of the lug on the clutch-head, which enters the recess by first engaging the dog 102 and lifting the same, as shown in Fig. 26, after which the dog springs back into place and locks the lug into position. It will be observed that the clutch-head cannot be engaged with the dogs unless the head is turned relatively to the dogs, as indicated by the arrow, Fig. 26ª, or unless the dogs are turned relatively to the head in the opposite direction. If the head is turned in the opposite direction or the dogs turned in the direction of the arrow in Fig. 26ª, the projection 101 will first raise dog 103 and its finger 103ʸ will lift dog 102, as here shown, and will not allow it to drop and engage the projection. It will be seen that by the construction described the collar 98 may be clutched to the bevel-gear by its longitudinal movement, which moves the clutch-head in engagement with the face of the gear, when the clutch-head will be locked by a rotary motion relative to the gear. The collar 98 is moved endwise by a clutch-lever 104, pivoted at its rear end to the bed-plate, provided with a pin 105, engaging in a peripheral slot in the collar 98, and with a ring 106, pivoted thereto and engaging loosely in a peripheral slot in the adjacent sleeve 72, this construction insuring the movement of the sleeve and collar endwise along the shaft by the movement of the clutch-lever. When the lever is moved to the left, both the sleeve and collar are carried to the left, the sleeve 72 disengaging from the pinion 97 and the clutch-head moving against the face of the wheel. In this position of the parts the movement of the drive-pulley is not transmitted to the shaft, owing to the disengagement of the sleeve 72 and the driving-pinion 97; but the reciprocating motion of the rack-bar due to the rotation of the circular rack by pinion 97 is transmitted to the collar 98, and the latter being clutched to the beveled wheel a reciprocating motion is imparted to the wheel and thence to the cam-cylinder. When, on the other hand, the clutch-lever is thrown to the right, the clutch is disengaged, the sleeve 72 engaged with the driving-pinion 97, and the rotary motion of this pinion is transmitted to the shaft through the sleeve 72 and from the shaft to the beveled gear and thence to the cam-cylinder, the rack-bar at the same time being reciprocated back and forth without affecting the rotary motion of the shaft. When this reversing-gear is thrown into action to perform the heeling and toeing operations by the movement of the clutch-lever to the left, the gate 24, before alluded to, is automatically and by movement of the clutch-lever adjusted in the path of the various cam-controlling devices in order that the inclined cam for elevating the heels of the needles and the elevating picking-cams may be automatically moved to operative positions. This movement of the gate is effected through the operating-rod 32, before alluded to, by a rocking head 107, mounted on a stud 108 on the upper end of the post 8. The clutch-lever is connected to this head on one side of the stud by a horizontal rod 109, pivoted to the lever, and to the lower end of a vertical rod 110, connected at its upper end to the rocking head. The gate-operating rod 32 is joined to the head on the opposite side of the stud, the result being that when the clutch-lever is moved to the left the head will be rocked and will move the operating-rod 32 endwise and throw the active end of the gate-lever inward. The end of the operating-rod where it engages the gate is reduced, forming a shoulder 111, and this reduced end extends through a slot in the rear end of the gate-lever, where it is held yieldingly against the inner end of the slot by a spring 112. When the rod is moved endwise in the direction of the rear, Fig. 1, the shoulder will engage the end of the lever and move its opposite end inward to an operative position, the shoulder serving to hold the lever in this position. When the lever is unlocked, as heretofore described, by the rearward movement of the locking-latch 27, the end of the latter will engage the rod and push it outward against the influence of the spring, thereby disengaging the shoulder and permitting the gate to resume its normal inoperative position. This peculiar construction of the parts admits of the unlocking of the gate without regard to the action of the clutch, which during the heeling and toeing operations remains in action after the gate has been unlocked. The clutch-lever after being operated to throw into action the reciprocating gear is locked in this position to the left, and the reciprocating motion of the cam-cylinder continues until the heel or toe has been formed by the action of the picking-cams, after which the clutch is automatically unlocked by the pattern-chain. The clutch-lever is locked in action by an angular lever 113, Figs. 1 and 18, fixed in line with the pattern-chain on one end of a horizontal rock-shaft 114, mounted in bearings on the under side of the bed-plate. One arm 113× of this lever extends adjacent to the pattern-chain in position to be engaged and moved by a high link 115 thereon, while the other arm is adapted to enter a notch 116 in a horizontal rod 117, pivoted to the under side of the clutch-lever and extending at its opposite end through a fixed guide on the frame. The rod is encircled by a spiral spring 118, bearing against the lever and guide, and it tends to urge the parts to the right, moving the clutch out of action. When the lever is moved to throw the clutch into action, the rod is moved endwise and the spring compressed, and the notch arriving opposite the arm 113 of the angular lever the arm engages therein and holds the clutch-lever to the left. When the high link 115 now engages the arm 113× of the angular lever, the other arm 113 is disengaged from the notch and the spring throws the clutch-lever to the right out of action and the cam-cylinder resumes its rotary motion to form plain work.

In forming slack tubular loose work for the leg of the stocking with the needle-cylinder raised to lengthen the stitches it is desirable that the thread fed to the needles be free from the action of the take-up, while, on the other hand, in the heeling and toeing operations it is desirable that the thread be fed subject to the action of the take-up. To meet these conditions, I provide a take-up device and means for rendering it operative and inoperative, according to the character of the work being formed. This device comprises an arm 119, Fig. 21, pivoted on a horizontal frame 120, sustained on the upper end of a tubular post 121, rising from the bed-plate. One end of the arm is formed with a guide-hook, through which the thread is fed, while its other end beyond its axis extends over the upper end of the tubular post and is acted on by a spring 122, tending to hold the active end of the arm upward in an operative position, so as to yield under the pull of the thread. The arm is rendered inoperative automatically through the action of the angular locking-lever 113 for the clutch-lever through the medium of a vertically-movable rod 123, extending in the tubular post, with its upper end in position to engage the end of the tension-arm and its lower end resting on a horizontal lever 124, Fig. 18, pivoted to the under side of the bed-plate, as at 125, Fig. 16, which lever in turn rests on the rear end of an arm 126×, fixed to the end of the rock-shaft 114, Fig. 20, before described as carrying the angular clutch-locking lever. The vertically-movable rod 123 is acted on by a spiral spring within the tubular post, which tends to hold the same downward with its upper end out of engagement with the take-up arm and the latter in action. This is the position of the parts when the clutch-locking lever is in the notch to hold the clutch locked. When, however, the locking-lever is disengaged by the pattern-chain, as described, the shaft 114 is rocked and the arm 126× moved upward, thereby elevating the end of lever 124, bearing thereon, and elevating the vertically-movable rod 123 in engagement with the end of the take-up arm, by which action the opposite end of the arm 119 is lowered and rendered inoperative. In the formation of the leg of the stocking in plain knitting it is desirable, owing to its length, that the pattern-chain travel at a comparatively-slower speed than when the heel or toe is formed, so as to avoid a pattern-chain of great length. I accomplish this result by an idler ratchet or guard wheel 126, Figs. 1, 3, 6, 19, and 20, mounted adjacent to a driving ratchet-wheel 127, fixed to a horizontal shaft 128, journaled in bearings on the bed-plate and carrying at one end a sprocket-wheel 129, over which the pattern-chain passes. The guard-wheel is slotted vertically at its center to receive the shaft and is mounted to rotate on a slotted plate 130, encircling the shaft and fixed to the upper end of a rod 131, whose lower end is loosely mounted on a stud 132, projecting from the side of the lever 124. By this construction the idler is moved vertically, and when in its lower position permits the engagement of a driving-pawl 131×, Fig. 3, with the driving-ratchet to rotate the shaft and advance the chain. When, however, the idler is raised, the driving-pawl engages and drives it, the teeth being so formed that the pawl is prevented from engaging the driving-ratchet, except at certain intervals. This action of the pawl is attained by forming certain of the teeth of the idler-ratchet deeper than the others to permit the engagement of the pawl with the driving-ratchet only when the pawl enters these deep teeth. In the present case every fourth tooth, as shown in Fig. 21, of the idler is deep, so that for every fourth stroke of the pawl the chain will be advanced one tooth when the idler is raised in action, and when lowered out of action the pawl is permitted to engage the driving-ratchet on every stroke and the chain is advanced at a correspondingly-greater speed. By reason of the connection of the rod carrying the plate on which the idler-ratchet rotates with the lever 124 the idler-ratchet is lifted into action only when the clutch-locking lever is disengaged to unlock the clutch for plain work, the idler being thrown out of action to cause the pattern-chain to move faster when the clutch is locked to cause the cam-cylinder to reciprocate to form the heel or toe.

The driving-pawl 131$^\times$, just described, is pivoted to the upper end of a vibrating lever 133, mounted on a horizontal axis on the bed-plate, with its lower end extending laterally forward beneath the plate, where it is provided with a lateral pin 134, Fig. 16. This pin is adapted to be engaged by a contact-plate 135, fixed to the cross-head 92, by which arrangement the pawl will be operated on every revolution of the rotary circular rack. Just previous to the operation by the pattern-chain of the angular locking-lever to release the clutch on the completion of the heeling or toeing operations I provide for the automatic severing of the extra thread which was incorporated in the fabric. This is accomplished by a cutter consisting of a fixed knife 136, Figs. 21, 22, and 23, fixed to the frame 120, and a movable cutting-blade 137, mounted adjacent to the same on one end of a rock-shaft 138, mounted in bearings on the frame. The other end of the rock-shaft has an arm 140 fixed to it, with its end bearing on the upper end of a vertically-movable operating-rod 141, extending downward through the frame, with its lower end bent laterally, as at 141$^\times$, and bearing on a rearwardly-extending arm 143 of an angular lever mounted on a horizontal axis 144 on the frame. This arm extends alongside the pattern-chain and is adapted to be engaged by a pin 145, projecting laterally from a link on the pattern-chain, which lifts the arm and rod, thereby rocking the shaft carrying the knife, which, in connection with the fixed blade, severs the thread. Both the rocking shaft and the operating-rod are encircled by spiral springs 146 and 147, respectively, which tend to hold the cutting-blade and rod downward, and they are operated against the influence of these springs to sever the thread. The extra thread is led through two guiding-eyes 147$^\times$ and 147$^a$ on the frame 120, located relatively so that the thread between the eyes will extend between the fixed and movable blades ready to be severed at the proper time.

When the rear arm 143 of the angular lever just described is raised by the link to sever the extra thread, its other arm 148, which extends upward at an inclination and which is provided with a laterally-extending lug 149, is moved forward with the lug projecting in the path of a horizontal finger 150, Figs. 1 and 30, connected to a plate 151, pivoted on the under side of a lug 152, projecting from the cam-cylinder. The plate is provided on its inner edge with a cam-surface in engagement with a pin 153, depending from a rod 154, mounted in a guiding-opening extending through the lug to the inner side of the cam-cylinder, where it has fixed to it a cam 155 for the purpose of engaging the heels of the needles first elevated by the inclined cam and returning them to action. As shown in Fig. 12, this cam is formed with an upwardly-inclined forward edge extending high enough to engage the inactive needles and return them to a position to be engaged by the stitching-cams. When out of action, the cam is held by a spring 156, Fig. 30, outward, free of the heels of the needles, with the pin 153 engaging the cam-surface on the plate 151, and when the arm 150 engages the arm 148 of the angular lever for operating the severing mechanism the plate is turned on its axis in the direction indicated by the arrow in Fig. 30, thereby pushing the rod 154 and cam inward to an operative position, where it is locked in position by the pin 153 engaging in the notch in the edge of the plate 151. The cam remains in this position until the needles are to be again elevated for the heeling or toeing operations, when another and longer arm 159 on the plate 151 will engage an inclined surface 160 on the gate-lever 25, Fig. 1, when the latter is moved inward, the result being that the plate will be turned on its axis, disengaging the pin from the notch, and the spring will return the parts to their former inoperative positions. From this description it will be seen that this cam is not thrown into action until the extra thread has been severed, which takes place at the termination of the heeling and toeing operation, when the needles are all to be employed to resume slack tubular work.

As shown in Figs. 4 and 27, the machine is equipped with the usual sinkers 161, mounted in slots in a sinker-cylinder 162, to act between the needles in the customary manner. The sinkers are moved inward to perform their functions by cams 163, facing in opposite directions, each consisting of a finger pivoted at one end to the upper side of a sinker cam-ring 164, movable with the cam-cylinder and having its inner edge formed to engage the sinkers. This pivoted finger has joined near its free end a rod 165, extending outward through a guiding-lug 166, beyond which it is threaded and provided with an adjusting-nut 167. The rod is encircled by a spiral spring 168, bearing against the cam and lug and acting to hold the cam inward to its work yieldingly. The spring is of such strength that under normal conditions it will hold the cam to its work, but will yield under abnormal conditions, such as the passage of "bunches"

or knots in the yarn, thereby avoiding jamming or breakage of the parts. I provide alongside of this cam a second sinker-cam of identically the same construction, but facing in the opposite direction, so as to operate when the cam-cylinder is moved in the opposite direction when reciprocated for the heeling or toeing operations. To provide for the adjustment of this cam, its position with respect to the sinkers may be varied to move the latter to a greater or less extent, according to the thickness of the yarn used and other conditions encountered in practice.

As shown in Figs. 28 and 29, the sinker cam-ring is provided with a guard-cam 169, extending adjacent to the needle-cylinder at its outer side and curved on its lower side to act in opposite directions. It is formed and located to engage the heels of the needles raised too high by the cam 19 or by the reverse movement of the depressing-cams and lower the needles to such a position that they will be engaged with certainty by the depressing picking-cams which act in the widening operation. This guard-cam is fixed to the inner lower end of an arm 170, whose upper end is slotted vertically and adjustably secured to a lug 171 by means of an adjusting-screw 172, extending through the slot and lug. By making this cam thus vertically adjustable I avoid the necessity of providing for the adjustment of the depressing picking-cams, which would be necessary when needles differing in size or differing as to location of their heels are employed.

The operation of the machine is as follows: The machine is started with all the needles in action, the various movable cams, the clutch mechanism, and take-up out of action, and the idler ratchet-wheel in action to advance the chain slowly. The belt-shifter is adjusted to shift the belt to the driving-pulley and locked in this position by the mechanism described, and the yarn is fed to the needles through a guide-ring encircling the upper ends of the needles and movable with the cam-cylinder. On motion being imparted to the driving-belt the driving-pulley is rotated, imparting to the cam-cylinder, through the driving-sleeve 72, driving-shaft, and bevel-gear 4, a rotary motion, resulting in the reciprocation of the needles and the production of a plain tubular fabric or web. The circular rack 94 is rotated by the pinion 97, and on each revolution the contact-plate 135 engages the vibrating lever 133 and by its driving-pawl 131× operates the pattern-chain one step for every fourth stroke of the pawl. The pattern-chain advances and the high link 12 thereon engages the arm 10, thereby raising the lever 14 and elevating the needle-cylinder bodily to lengthen the stitches to produce loose work for the leg portion of the stocking. This high link is followed by others gradually decreasing in height, so as to gradually lower the cylinder and reduce the length of the stitches, and the operation is continued until the ankle is reached and when the cylinder resumes its former position, with the needles producing stitches of normal fineness. After the ankle has been formed the elevated link 89, Fig. 24, at the left side of the pattern-chain engages the belt-shifter-operating arm 88 on the rock-shaft 87 and the locking mechanism for the shifter is released and the belt shifted to the loose pulley, thereby stopping the operation of the machine. An extra thread is now joined by hand to that being fed, and the clutch-lever is thrown to the left, by which action the reversing-gear is connected to the bevel driving-gear to impart to the cam-cylinder a rotary reciprocating motion. By the movement of the clutch-lever to the left the gate 24 is thrown into action and locked, the take-up rendered operative, and the idler ratchet-wheel rendered inoperative to permit the chain to be advanced for every stroke of the pawl. The driving-shaft 69 is now turned by hand by means of a crank 69× thereon, thus turning the beveled wheel 4 and the cam-cylinder until the latter has made nearly a complete revolution or has moved sufficiently to bring into action the inclined cam for raising half the needles out of action and the elevating picking-cams for alternately raising the active needles. When the latter cams are first moved into action by the yoke engaging the gate, they are followed by the inclined cam, which by engagement with the gate is raised and elevates the needles out of action, the gate being by this cam unlocked. During the movement of the gear-wheel by the hand-crank the clutch-dogs are carried past the clutch-head in the direction of the arrow in Fig. 26ª, in which direction they will not lock, and when the cylinder has been moved sufficiently to bring into action the inclined cam the movement of the crank is reversed and the dogs in moving in the opposite direction will lock the clutch-head. The reversing-gear now becomes operative, and the belt-shifter being adjusted to push the belt to the driving-pulley is locked in this position, and the cam-cylinder is given a rotary reciprocating motion, with the elevating picking-cams acting at the end of each reciprocation to alternately raise out of action the needles on the end of the series in action. This results in a gradual narrowing of the fabric for the heel and continues until the proper number of needles have been left in action to insure the proper degree of narrowness. At this time a high link on the pattern engages the arm 10, by which the needle-cylinder was elevated; but this link is only high enough to elevate the lever 14 slightly, and it raises the beveled head 67 in the path of the yoke-locking pawl 51, by which the yoke is unlocked and the elevating picking-cams thrown out of action and the depressing picking-cams thrown into action. The reciprocation of the cam-cylinder continues with the depressing picking-cams acting at the end of each reciprocation to alternately depress at the end of the series of active needles those previously raised one at a time by the elevating picking-cams. This produces a gradual widening of the fabric to complete the heel, and when all the needles have been thus depressed into action the pin 145 on the chain engages beneath the rearwardly-extending arm 143 of the angular lever for operating the cutter and the extra thread is severed. By the movement of this angular lever by the chain its upper arm 148 is moved in the path of the arm 150, Fig. 30, and the cam 155 is thrown into action. Immediately following this action the link 115 on the chain engages the clutch-locking lever 113$^\times$ and unlocks the clutch, thereby disengaging the reversing-gear, moving the idler ratchet-wheel upward into action, and throwing the take-up out of action. The rotation of the cam-cylinder causes the cam 155 to depress in action the needles raised by the inclined cam, and the rotating motion of the cam-cylinder continues, as at first, with all the needles in action and producing plain tubular work. The pattern-chain is formed to continue the tubular work for the proper time to produce the foot of the stocking and to again bring into action the narrowing and widening cams for forming the toe.

During the heeling and toeing operations, when the extra thread is incorporated, I propose to provide for the raising of the needle-cylinder to lengthen the stitches, and this is effected through the action of the clutch-lever to connect the reversing-gear by providing the rocking head 107 with a vertical set-screw 107$^\times$, having its lower end in position to ride up an inclined cam-surface 107$^2$ on the upper end of the tubular depending casting 9, when the clutch-lever is thrown to the left to connect the reversing-gear. The movement of the screw on the cam-surface will act to raise the post 8, and through its connection with the clamping-ring 6 will elevate the needle-cylinder and lengthen the stitches. The needle-cylinder will remain in this raised position until the reversing-gear is disengaged at the end of the heeling and toeing operations, when the movement of the clutch-lever to the right will rock the head and carry the screw down the inclined cam, thereby lowering the needle-cylinder.

Having thus described my invention, what I claim is—

1. In a knitting-machine the combination with the cam-cylinder and stitching-cams, of the elevating picking-cams sustained normally outward of the path of the heels of the needles and movable inward of the cam-cylinder to an operative position in the path of the heels and mounted to swing upward to elevate the needles.

2. In a knitting-machine the combination with the cam-cylinder and stitching-cams, of the elevating picking-cams sustained normally outward of the stitching-cams and outward of the path of the heels of the needles and movable inward to an operative position and mounted to swing upward.

3. In a knitting-machine the combination with the cam-cylinder and stitching-cams, of the elevating picking-cams mounted to swing upward and sustained normally outward of the path of the heels of the needles, and movable inward to an operative position, and a movable yoke-plate for moving them inward.

4. In a knitting-machine the combination with the cam-cylinder and stitching-cams, of the elevating picking-cams, arms carrying the picking-cams at their upper ends, studs on which the lower ends of the arms are loosely mounted, means acting on the arms to normally hold them outward with the cams inoperative, and a movable yoke-plate provided with openings through which the studs extend.

5. In a knitting-machine the combination with the cam-cylinder and stitching-cams, of the elevating picking-cams movable inward to an operative position, a movable yoke-plate for moving the cams inward, and a locking device adapted to engage and lock the yoke-plate when the latter is operated to move the cams.

6. In a knitting-machine the combination with the cam-cylinder and stitching-cams, of the elevating picking-cams movable inward to an operative position, a locking device adapted to hold the cams inward and a movable stop adapted to be adjusted in the path of the locking device to release the same.

7. In a knitting-machine the combination with the cam-cylinder and stitching-cams, of the elevating picking-cams movable inward to an operative position, a pivoted yoke-plate having its lower end arranged to engage and move the cams inward, a locking device adapted to engage and hold the yoke-plate with the cams inward, and a movable stop adapted to be adjusted in the path of the locking device and serving to unlock the same.

8. In a knitting-machine the combination with the cam-cylinder and stitching-cams, of the elevating picking-cams movable inward to an operative position, a movable yoke-plate for operating said cams, and a movable gate adapted to be adjusted in the path of the yoke-plate.

9. In a knitting-machine the combination with the cam-cylinder and stitching-cams, of the elevating picking-cam mounted to swing upward and movable inward to an operative position, means for moving the cam inward to its operative position and means for moving it upward just previous to its inward movement.

10. In a knitting-machine the combination with the cam-cylinder and stitching-cams, of the elevating picking-cam mounted to swing upward and move inward to an operative position, a pivoted yoke-plate adapted to move the cam inward, and a movable gate adapted to be adjusted in the path of the cam and yoke-plate; whereby the cam will be moved upward previous to its inward movement under the action of the yoke-plate.

11. In a knitting-machine the combination with the cam-cylinder and stitching-cams, of the elevating picking-cams, a swinging arm carrying said cam at its upper end and movable bodily inward, a movable yoke-plate engaging said arm, and a movable gate adapted to be adjusted in the path of the arm and yoke-plate, said parts being so formed and constructed that the arm will engage the gate previous to the engagement of the plate therewith; whereby the arm will be swung upward previous to its inward movement to throw the cam to an operative position.

12. In a knitting-machine, the combination with the cam-cylinder and stitching-cams, of the horizontal guide-rods mounted on the cylinder, a block mounted to slide on said rods, springs encircling the rods and engaging the block, and a depressing picking-cam pivoted to the block.

13. In a knitting-machine the combination with the cam-cylinder and stitching-cams, of the depressing picking-cam mounted to swing downward, a weighted plate acting on the cam and tending to throw it upward by gravity, and an adjustable stop in position to be engaged by the plate to limit the upward movement of the cam.

14. In a knitting-machine, the combination with the cam-cylinder and stitching-cams, of elevating picking-cams normally outward of the path of the needle-heels and movable inward of the cylinder in the path of the same, depressing picking-cams movable downward to lower the needles, and a movable plate adapted to engage the elevating picking-cams and move them inward to operative positions, said plate formed to simultaneously engage the depressing-cams and move them to inoperative positions.

15. In a knitting-machine, the combination with the cam-cylinder and stitching-cams, of elevating picking-cams sustained normally outward of the path of the needle-heels, and movable inward, a vertical yoke-plate mounted on a horizontal axis and adapted to be swung inward at its lower end and engage the picking-cams, depressing picking-cams pivoted to swing downward and provided at the outer side of the cylinder with plates, arms on the yoke-plate in position to engage said plate on the depressing-cams when the yoke-plate is swung inward on its axis.

16. In a knitting-machine, the combination with the cam-cylinder and stitching-cams, of a vertically-movable elevating-cam resting normally below the heels of the needles and mounted in an inclined guideway in the cylinder, a spring acting to hold the cam down, a gravitating latch adapted to engage the cam and hold it when raised to an operative position, and an arm carried by the cam in position to engage the latch when the cam is raised above its operative position; whereby the spring will act to throw the cam downward before the latch can fall inward.

17. The combination with the cam-cylinder, of a vertically-movable cam, a spring acting thereon and tending to depress the same, means for raising the cam to an active position, a swinging locking-dog sustained adjacent to the cam in position to engage and hold the cam raised when swung inward, means for raising the cam above its normal active position, and an arm carried by the cam in position to engage the locking-dog and swing it outward free of the cam when the latter is elevated above its active position; whereby the depressing-spring will act to quickly depress the cam before the dog can swing inward and engage the cam.

18. In a knitting-machine, the combination with the rotary cam-cylinder and stitching-cams, of means for raising a portion of the needles out of action, a cutting mechanism for severing an extra thread incorporated for the heeling and toeing operations, a cam carried by the cylinder for returning the elevated portion of needles into action and sustained normally out of the path of the elevated needles, said cam being provided with a finger, a lever adapted to be operated to actuate the cutting mechanism and arranged to be simultaneously moved in the path of the finger.

19. In a knitting-machine the combination with the cam-cylinder and stitching-cams of elevating picking-cams sustained normally out of action, a movable gate controlling the movement of the picking-cams to action, a reversing-gear for imparting to the cam-cylinder a reciprocating motion, a manually-operated lever for connecting said gear with the cylinder, a rocking head sustained by the frame a link connecting the head with the lever and a second link connecting the head with the gate.

20. In a knitting-machine the combination with the cam-cylinder and cams, of a reversing-gear adapted to impart to the cylinder a rotary reciprocating motion, means for connecting said gear with the cylinder, a locking device comprising angular lever $113^\times$ for holding the gear connected, means acting on the locking-lever to release the gear, a take-up mechanism, a device comprising the movable rod 123 for rendering it inoperative, and a finger $126^\times$ connected to the angular lever and adapted to move the rod and render the take-up device inoperative when the locking device is operated to release the gear.

21. In a knitting-machine the combination with the cam-cylinder of a reversing-gear for imparting to the same a reciprocating movement, means comprising angular lever $113^\times$ for connecting it to the cylinder means for locking the same connected, means for unlocking the gear and disengaging it, a pattern-chain, a movable guard-wheel for controlling the speed of the chain, a lever 124 connected with the guard-wheel and a finger 126 connected with the angular lever $113^\times$ and engaging lever 124 to move the wheel in action when the locking device is operated to release the gear.

22. In a knitting-machine the combination with the cam-cylinder, of the gear-wheel engaging the same and provided with a clutch member, a drive-shaft connected to said gear-wheel, a drive-pulley mounted loosely on the shaft, a pinion fixed to the pulley, a circular rack driven by said pinion, a reciprocating rack connected to the circular rack, a driving-sleeve splined to the shaft and adapted to be clutched to the driving-pinion, and a pinion 99 engaged by the rack and formed with a clutch member adapted to be engaged with that on the gear engaging the cylinder.

23. In a knitting-machine the combination with the cam-cylinder and stitching-cams, and means for raising the needles out of action, of depressing picking-cams for lowering them singly into action, a guard-cam movable with the cam-cylinder adjacent to the needle-cylinder and having its lower edge curved to operate in opposite directions on the needles raised.

24. In a knitting-machine the combination with the cam-cylinder and stitching-cams of the two depressing picking-cams carried by the cylinder at the opposite sides of and beyond the stitching-cams, means for elevating the needles out of action and a guard-cam movable with the cam-cylinder and situated with reference to the picking-cams to travel in advance of the same, and act on the elevated needles and lower them in the path of the depressing-cams.

25. In a knitting-machine, the combination with the needle-cylinder, its needles and the cam-cylinder and cams, of sinkers movable inward between the needles, a sinker-cam pivoted at one end, a rod jointed to the cam near its other end, a guiding-lug through which the rod extends, an adjusting-nut on the rod outside the lug, and a spring encircling the rod between the cam and the lug; whereby the cam may be adjusted to or from the sinkers.

26. In a knitting-machine, the combination with the cam-cylinder and stitching-cams, of elevating picking-cams sustained normally outward of the path of the needle-heels and movable inward in the path of the same, said cams being adapted to swing upward to elevate the needles, a movable plate adapted to engage and move the cams inward, and a gate adapted to be adjusted in the path of the plate.

In testimony whereof I hereunto set my hand, this 1st day of July, 1898, in the presence of the attesting witnesses.

WILLIAM R. DILLMORE.

Witnesses:
WM. A. SHRYOCK,
JOHN C. EGLY,
LOUIS F. SCHUCK.